Oct. 19, 1971      G. L. CRUMP      3,613,411
LOCKING DEVICE FOR A REMOVABLE CONNECTOR
Filed June 26, 1969
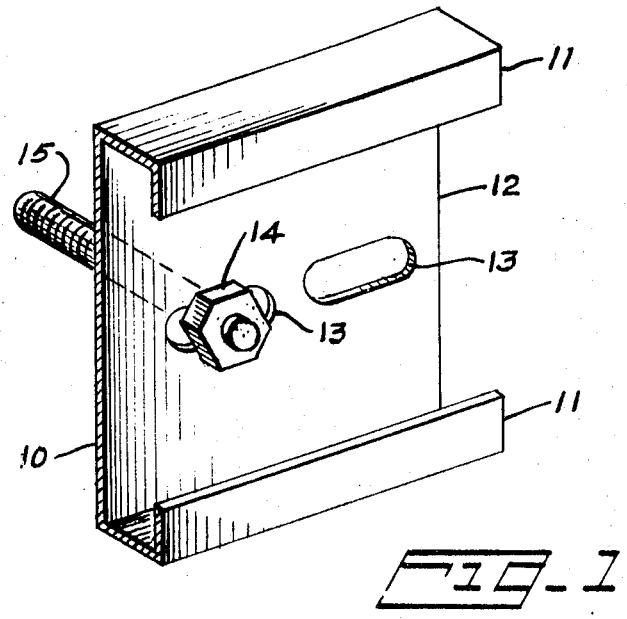
FIG. 1
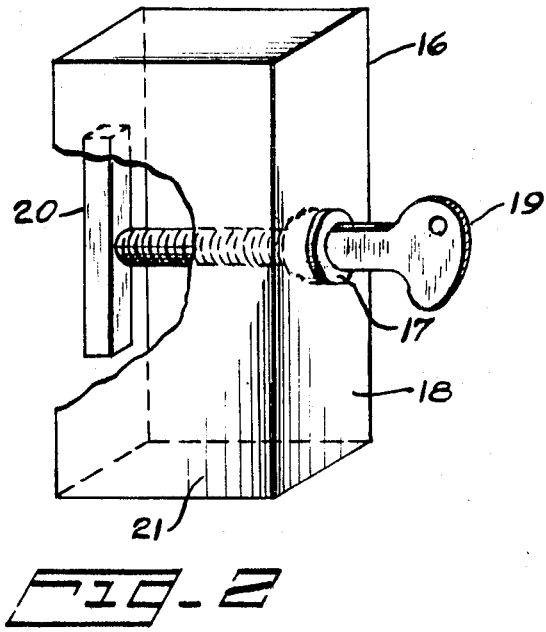
FIG. 2
INVENTOR.
GERALD L. CRUMP
BY 
ATTORNEY

United States Patent Office 3,613,411
Patented Oct. 19, 1971

3,613,411
LOCKING DEVICE FOR A REMOVABLE CONNECTOR
Gerald L. Crump, 6250 NW. 18 Court,
Sunrise Golf Village, Fla. 33313
Filed June 26, 1969, Ser. No. 836,731
Int. Cl. F16b 41/00
U.S. Cl. 70—232
3 Claims

ABSTRACT OF THE DISCLOSURE

A locking box for a removable connector with a flat housing having flanged sides for cooperation with a locking mechanism encased in a detachable cover.

BACKGROUND OF THE INVENTION

This invention relates generally to a device for preventing the detachment of a removable connecting device by the enclosure of the movable element in a small box having a locking mechanism.

Locking boxes for removable connectors, such as nuts and bolts, are well-known in the art. Those found in the prior art can be characterized as being complex and expensive to build with respect to the function of the device. The alarming increase of automobile radio and tape recorder thefts from parked automobiles has created a need for a device that will protect such a car radio or recorder. The problem results partly because most automobile radios and recorders are made easily detachable for repair purposes. The automobile radios and recorders are usually secured by either two or four nuts and bolts. This invention prevents the removal of such a connector securing the radio or recorder to the automobile.

BRIEF SUMMARY OF THE INVENTION

This invention consists generally of a locking box comprising a flat housing having an aperture for receiving a removable connecting device and a lockable housing cover. The flat housing has flanged sides for cooperation with a locking mechanism encased in the housing cover. When in place, the flat housing will be secured to the removable connecting device adjacent the other joined objects. The detachable element of the connecting device is covered by the housing cover, which is then locked to the flat housing.

It is an object of this invention to provide a removable connector locking box.

It is a further object of this invention to provide a non-complex and inexpensive removable connector locking box.

Still another object of this invention is to provide a removable connector locking box that is easy to install.

In accordance with these and other objects which will be apparent hereinafter, the instant invention will now be described with particular reference to the accompanying drawing.

BRIEF DESCRIPTION OF THE DRAWING

In the drawing:
FIG. 1 is a perspective view of the flanged housing.
FIG. 2 is a perspective side view of the box cover with a cutaway showing part of the locking mechanism.

DESCRIPTION OF THE PREFERRED EMBODIMENT

Referring now to the drawing, a preferred embodiment of the invention is shown. FIG. 1 shows flat housing, indicated generally at 10 having flanges 11 and bottom plate 12. The removable connector is illustrated as nut 14 and threaded bolt end 15 to pass through bottom plate 12 for union with nut 14. For simplicity, no bolt end or nut is shown at aperture 13'. The head of bolt 15 (not shown) could be secured to an outomobile accessory and a mounting device (not shown) that is joined to the automobile. Such elements are well-known in the art.

FIG. 2 shows the locking box cover indicated generally at 16. Side 21 is cutaway to better show locking bar 20. Locking mechanism 17 consisting of any well-known locking device having a movable locking bar 20 is encased in cover top 18. A key 19 is shown inserted in locking mechanism 17. Cover 16 is so constructed that it fits firmly around and over housing 10. Locking mechanism 17 has been exaggerated in length for illustrative purposes only. Locking bar 20 would normally be much closer to cover top 18.

In operation housing 10 is positioned so that threaded bolt end 15 projects through aperture 13. Washers (not shown) may be placed over the end of bolt 15. Nut 14 is tightened securing housing 10 to the automobile mounting device (not shown). Most automobile radios and recorders are mounted with two bolts and nuts on each side. The bolt heads are normally inaccessibly positioned or bolt studs may be employed. Provision is made for this type mounting in the preferred embodiment by having two apertures 13 and 13'. This would insure non-rotation of the locking box if someone attempted to loosened nut 14 by rotating the entire locking box. After the nut or nuts are secured, cover 16 is placed over housing 10. Key 19 is rotated, thus rotating locking bar 20, until locking bar 20 cooperates with flanges 11 on housing 10 in such a way as to prevent removal of cover 16. The locking mechanism 17 is placed in the center of cover top 18 to prevent contact with nut 14, thus allowing for a more compact unit. Flanges 11 are made wide enough to properly cooperate with locking bar 20, but narrow enough to provide adequate space for tightening or loosening the nuts. Apertures 13 and 13' are oblong in shape for adaptability to various sized automobile mounting devices.

A non-complex, inexpensive removable connector locking device has been disclosed that is easy to install and especially effective to prevent the theft of a car radio or recorder. The instant invention has been shown and described herein in what is considered to be the most practical and preferred embodiment. It is recognized, however, that departures may be made therefrom within the scope of the invention.

What I claim is:
1. A locking box for at least one removable connector comprising,
   a C-shaped channel including a base portion having at least one elongated apertures, side portions projecting from said base portion, and flange portions projecting from said side portions lying generally parallel to said base portion,
   a cup shaped cover box with sides encompassing the C-shaped channel to locate the flange portions within said cup,
   a key actuated locking mechanism with a rotatable locking bar that is actuated by a key, said locking mechanism connected centrally to the top of said box, said locking bar sized to engage the under side of said flange portions simultaneously to secure connectors in said box.
2. A locking box as in claim 1, including: said C-shaped channel base having a second elongated aperture adjacent said first elongated aperture.

3. A locking box as in claim 2, wherein: the elongated axis of said first aperture is in-line with the elongated axis of said second aperture.

References Cited

UNITED STATES PATENTS

| | | | |
|---|---|---|---|
| 1,339,075 | 5/1920 | Toelle | 70—232 |
| 1,434,492 | 11/1922 | Johnson | 70—230 X |
| 2,322,347 | 6/1943 | Churchman | 70—232 |
| 2,345,949 | 4/1944 | Robbins | 70—232 |
| 2,800,090 | 7/1957 | Reid | 70—168 X |
| 3,434,312 | 3/1969 | Buchman | 70—232 X |
| 2,861,463 | 11/1958 | Gilman | 74—526 |
| 3,096,409 | 7/1963 | Hubbell et al. | 200—44 |

FOREIGN PATENTS

| | | | |
|---|---|---|---|
| 329,696 | 9/1935 | Italy | 70—232 |

ALBERT G. CRAIG, Jr., Primary Examiner

U.S. Cl. X.R.

220—25